United States Patent
Okamoto et al.

(10) Patent No.: US 7,135,993 B2
(45) Date of Patent: Nov. 14, 2006

(54) ON-VEHICLE INFORMATION PROVISION APPARATUS

(75) Inventors: Yoshihisa Okamoto, Hiroshima-Ken (JP); Youko Hoshino, Hiroshima-Ken (JP); Shigefumi Hirabayashi, Hiroshima-Ken (JP)

(73) Assignee: Mazda Motor Corporation, Hiroshima-Ken (JP)

( * ) Notice: Subject to any disclaimer, the term of this patent is extended or adjusted under 35 U.S.C. 154(b) by 0 days.

(21) Appl. No.: 10/947,665

(22) Filed: Sep. 23, 2004

(65) Prior Publication Data

US 2005/0093719 A1    May 5, 2005

(30) Foreign Application Priority Data

Sep. 26, 2003    (JP) ............................. 2003-335042

(51) Int. Cl.
G08G 1/123    (2006.01)
(52) U.S. Cl. ............................. 340/995.1; 340/426.19; 701/1
(58) Field of Classification Search ............. 340/995.1, 340/990, 995.17, 309.16, 426.19, 995.19; 701/1, 201, 300; 705/7; 345/4
See application file for complete search history.

(56) References Cited

U.S. PATENT DOCUMENTS

| | | | |
|---|---|---|---|
| 6,067,008 A * | 5/2000 | Smith | 340/438 |
| 6,144,424 A * | 11/2000 | Okuda et al. | 349/65 |
| 6,185,501 B1 * | 2/2001 | Smith et al. | 701/200 |
| 6,377,886 B1 | 4/2002 | Gotou et al. | 701/201 |
| 2003/0050742 A1 * | 3/2003 | Sakamoto et al. | 701/1 |
| 2003/0050744 A1 * | 3/2003 | Saraiva | 701/1 |
| 2004/0204848 A1 * | 10/2004 | Matsuo et al. | 701/211 |

FOREIGN PATENT DOCUMENTS

| | | |
|---|---|---|
| DE | 199 57 550 A 1 | 6/2001 |
| JP | 09-035177 | 2/1997 |
| JP | 11-065431 | 3/1999 |
| JP | 11-101653 | 4/1999 |
| JP | 2001-101566 | 4/2001 |
| JP | 2002 267470 A | 9/2002 |
| JP | 2002 296050 A | 10/2002 |

* cited by examiner

Primary Examiner—Phung T. Nguyen
(74) Attorney, Agent, or Firm—Nixon Peabody LLP; Donald R. Studebaker

(57) ABSTRACT

An on-vehicle information provision apparatus is provided that visually provides a vehicle occupant with an advertisement. The apparatus includes display condition setting device that sets predetermined display conditions for displaying the advertisement, condition determination device that determines whether or not the display condition applies, and advertisement display device that, when said display condition does apply, visually provides the occupant with the advertisement shown superimposed on an actual landscape being viewed by the occupant.

6 Claims, 15 Drawing Sheets

FIG.5

VIRTUAL IN REAL
SYSTEM INITIAL SETTINGS I

● VISUAL ACUITY AND DYNAMIC VISUAL ACUITY LEVEL WILL BE VERIFIED.

( VERIFICATION OF VISUAL ACUITY AND DYNAMIC VISUAL ACUITY LEVEL )

● EYE POSITION WILL BE REGISTERED.

( REGISTRATION OF EYE POSITION )

FIG.6

```
        VIRTUAL IN REAL SYSTEM INITIAL SETTINGS II
● USER SETTINGS (BASIC ITEMS)

◆ VIRTUAL OBJECT DISPLAY    ■ ON  □ OFF (CAN BE SET FOR EACH AREA)
     MIVI DISPLAY           ■ ON  □ OFF
     MESSAGE DISPLAY        ■ ON  □ OFF
     ADVERTISEMENT DISPLAY  ■ ON  □ OFF
◆ VIRTUAL DISPLAY PRIORITY (CAN BE SET FOR EACH AREA)
1: MESSAGE  2: NAVI  3: ADVERTISEMENT
◆ VIRTUAL DISPLAY SETTINGS
<MAGNIFICATION>
  ■ NORMAL(NORMAL)  □ X2  □ X3
  □ AUTO (MAGNIFY DISTANT OBJECTS,
          NORMAL SIZE FOR CLOSE OBJECTS)
<NUMBER OF SIMULTANEOUS DISPLAYS>
<CAN BE SET FOR EACH AREA>
  ■ DEFAULT  □ MINIMUM  □ FEW  □ MANY  □ MAXIMUM
<SUPERIMPOSED DISPLAY>
  ■ PROHIBIT(■ TILED DISPLAY  □ PROHIBIT)  □ PERMIT
<OBJECT DISPLAY AREA>
(CAN BE SET FOR NAVI/MESSAGE/ADVERTISEMENT)
  ■ STANDARD  □ SMALL  □ LARGE  □ MAXIMUM
◆ VIRTUAL OBJECT DISPLAY TIME
(CAN BE SET FOR NAVI/MESSAGE/ADVERTISEMENT)
· CONTINUOUS TIME: □ CONTINUE TO SHOW WHILE VISIBLE  ■ (15 SECONDS)
· TOTAL TIME: □ CONTINUE TO SHOW WHILE VISIBLE  ■ (3 MINUTES)
◆ OTHER SETTING
   ■ WITH VOICE GUIDANCE
      (GUIDANCE INSERTED DURING OBJECT DISPLAY)
   ■ WITH OBJECT DISPLAY
   ■ CORRECT DISPLAY FOR EACH OCCUPANT
   □ ENLARGE/REDUCE/DELETE
```

FIG.11

●VIRTUAL IN REAL SYSTEM INITIAL SETTINGS III

●USER SETTINGS (NAVI RELATED)
 BY AREA   BY TIME SLOT   BY DAY   BY OCCUPANT
◆VIRTUAL OBJECT DISPLAY ITEMS
    DESTINATION         ■ON  □OFF
    FACILITY            ■ON  □OFF
    DETAILED INFORMATION □ON  ■OFF
    LEAD CAR            ■ON  □OFF
    GUIDE ARROW         □ON  ■OFF
    LANDMARK            ■ON  □OFF

◆DISPLAYED FACILITY SETTINGS
 ■REGISTERED FACILITIES  ■CONVENIENCE STORES (DETAILS)
 ■STATIONS  ■GASOLINE STANDS (DETAILS)
 ■LEISURE & ENTERTAINMENT (DETAILS)  ■RESTAURANTS (DETAILS)
 ■EVENT INFORMATION (DETAILS)  ■FAMOUS PLACES (DETAILS)······

◆OBJECT DISPLAY AREA
 ■STANDARD  □SMALL  □LARGE  □MAXIMUM
◆VIRTUAL OBJECT DISPLAY TIME
 CONTINUOUS TIME:□CONTINUE TO SHOW WHILE VISIBLE■ (15 SECONDS)
 TOTAL TIME:□CONTINUE TO SHOW WHILE VISIBLE■ (3 MINUTES)

◆DESTINATION SETTING FUNCTION
 VOICE        ■ON  □OFF
 POINT        ■ON  □OFF

◆GROUP RUNNING FUNCTION
 MEMBER REGISTRATION   (0001. 0002. 0341. 0055····)
 SET LEADER   (0001)
 FACILITIES DISPLAYED TO GROUP MEMBERS
    □REGISTERED FACILITIES  ■CONVENIENCE STORES (DETAILS)
    ■STATIONS   □GAS STATION (DETAILS)  □RECREATION (DETAILS)
    ■RESTAURANTS (DETAILS)  ■EVENT INFORMATION (DETAILS)
    ■FAMOUS PLACES (DETAILS)······
 NOTIFICATION FUNCTION
    ■NOTIFY THAT INFORMATION CAN BE SHARED (■COLOR  □VOICE)

FIG.13

● VIRTUAL IN REAL SYSTEM INITIAL SETTINGS IV

● USER SETTINGS (MESSAGE RELATED)

◆ LOCATION-SPECIFIC MESSAGE REGISTRATION
<SET LOCATION>

WHERE NATIONAL HIGHWAY
NO. 2 PASSES NEAR SAIJO, HIROSHIMA CITY,
HIROSHIMA PREFECTURE <PERIOD>
JUNE 6, 2003 TO JUNE 6, 2003; TIME SLOT: ALL DAY <DISPLAY IMAGE AND IMAGE ADJUSTMENT>

( DESIGNATE/
REVISE DISPLAY CONTENT )

( CONFIRM DISPLAYED CONTENT )

( REGISTER )

<MESSAGE RECIPIENTS>
☐ OCCUPANTS IN USER'S VEHICLE
■ OCCUPANTS IN FRIEND'S VEHICLE:(001. 002. 004. 065. 075)

◆ NON-LOCATION-SPECIFIC MESSAGE REGISTRATION
<DISPLAY SETTINGS>
☐ ANY BACKGROUND
☐ USE CAR AHEAD AS BACKGROUND
☐ SKY  ☐ ROAD  ☐ BUILDING  ☐ SIGNBOARD/SIGN  ☐ ···

<DISPLAY TIMING>
● DISPLAY FROM 15:00 TO 15:05
☐ WHEN THE SEA COMES INTO VIEW
☐ EVERY 3 HOURS

<SET PERIOD>
JUNE 6, 2003 TO JUNE 6, 2003

FIG.14

●VIRTUAL IN REAL SYSTEM INITIAL SETTINGS V

●USER SETTINGS (ADVERTISEMENT RELATED)

◆LOCATION-SPECIFIC MESSAGE REGISTRATION
<SET LOCATION>

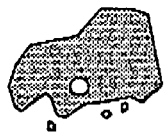

WHERE NATIONAL HIGHWAY NO. 2 PASSES NEAR SAIJO, HIROSHIMA CITY, HIROSHIMA PREFECTURE

<PERIOD>
JUNE 6, 2003 TO JUNE 6, 2003; TIME SLOT: ALL DAY

<DISPLAY IMAGE AND IMAGE ADJUSTMENT>

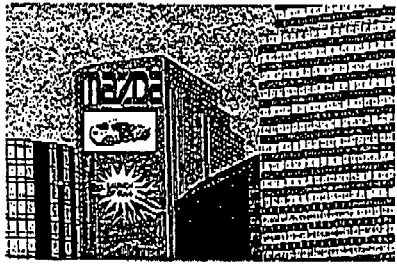

( DESIGNATE/REVISE ADVERTISEMENT CONTENT )

( CONFIRM DISPLAYED CONTENT )

( REGISTER )

<ADVERTISEMENT RECIPIENT>
  ☐CONTRACTED TO RECEIVE ADVERTISEMENTS
  ☐DESIGNATE ADVERTISEMENT RECIPIENT:

◆NON-LOCATION-SPECIFIC MESSAGE REGISTRATION
<DISPLAY SETTINGS>
  ☐ANY BACKGROUND
  ☐USE CAR AHEAD AS BACKGROUND
  ☐SKY  ☐ROAD  ☐BUILDING  ☐SIGNBOARD/SIGN  ☐···

<DISPLAY TIMING>
  ●DISPLAY FROM 15:00 TO 15:05
  ☐WHEN THE SEA COMES INTO VIEW
  ☐EVERY 3 HOURS

<SET PERIOD>
  JUNE 6, 2003 TO JUNE 6, 2003

ON-VEHICLE INFORMATION PROVISION APPARATUS

BACKGROUND OF THE INVENTION

1. Field of the Invention

The present invention relates to an on-vehicle information provision apparatus, particularly to an on-vehicle information provision apparatus that visually provides a vehicle occupant with an advertisement.

2. Description of the Related Art

There is known an on-vehicle information provision apparatus (navigation system) that guides a vehicle to a set destination by providing the driver with information to navigate the vehicle to the destination (see Japanese Patent Unexamined Publication No. 11-101653). With such a system, route and other information is communicated to the vehicle occupant as visual information on a dedicated display screen or as voice information from a loudspeaker.

However, in an on-vehicle information provision apparatus such as that which includes the above navigation system, visual information is communicated to the driver and other occupants by being displayed on a monitor screen located near a center console. Therefore, if such an on-vehicle information provision apparatus is used to provide the occupant with the advertisement in the form of visual information, the advertisement will be displayed on the monitor screen.

So in order to obtain the visual information from the on-vehicle information provision apparatus, the driver, who is looking to the front through the windshield as he drives, has to move his (or her) line of sight from the front of the vehicle to the monitor screen near the center console. Other occupants who wish to obtain the visual information also have to look at the monitor screen near the center console.

Thus, in order to visually receive the advertisement, the occupant has to move his line of sight to the monitor screen, and it is not possible to visually receive the advertisement when the monitor is not being watched.

SUMMARY OF THE INVENTION

It is therefore an object of the present invention to provide an on-vehicle information provision apparatus that enables occupant to visually obtain an advertisement without looking at the monitor screen.

The above object is achieved according to the present invention by providing an on-vehicle information provision apparatus for visually providing a vehicle occupant with a advertisement, the apparatus comprising display condition setting device that sets predetermined display conditions for displaying the advertisement, condition determination device that determines whether or not said display condition applies, and advertisement display device that, when the display condition does apply, visually provides the occupant with the advertisement shown superimposed on an actual landscape being viewed by the occupant.

In accordance with the present invention, the advertisement is displayed on the actual landscape being viewed by the occupant, so the occupant can receive the advertisement without having to look at the monitor screen.

In a preferred embodiment of the present invention, the on-vehicle information provision apparatus further comprises map information receiver that receives map information from an information center, the map information receiver receiving advertise information for displaying the advertisement together with the map information.

In another preferred embodiment of the present invention, the display condition setting device sets an area as the display condition, and the condition determination device determines whether or not a vehicle location is in the area.

In accordance with the present invention, it is possible to provide the occupant with the advertisement when the vehicle is running (or has stopped) in a specific area.

In another preferred embodiment of the present invention, the display condition setting device sets a time slot as the display condition, and the condition determination device determines whether or not current time is in the time slot.

In accordance with the present invention, it is possible to provide the occupant with the advertisement at a specific time.

In another preferred embodiment of the present invention, the on-vehicle information provision apparatus further comprises an advertisement information receiver that receives advertise information for displaying the advertisement from an information center.

In another preferred embodiment of the present invention, the on-vehicle information provision apparatus further comprises a first display prohibition device that prohibits the advertisement from being displayed except when the vehicle is stopped or moving in a straight line.

In accordance with the present invention, safety can be ensured when the vehicle is running.

In another preferred embodiment of the present inventions the on-vehicle information provision apparatus further comprises a second display prohibition device that prohibits the advertisement from being displayed over an actual traffic sign or other actual visual traffic information.

In accordance with the present invention, safety can be ensured when the vehicle is running.

The above object is also achieved according to the present invention by providing an on-vehicle information provision apparatus for visually providing a vehicle occupant with an advertisement, said apparatus comprising display condition setting means for setting predetermined display conditions for displaying the advertisement, condition determination means for determining whether or not said display condition applies, and advertisement display means for, when said display condition does apply, visually providing the occupant with the advertisement shown superimposed on an actual landscape being viewed by the occupant.

The above object is also achieved according to the present invention by providing an information distribution server that distributes map information to predetermined vehicles, the server comprising a map information storing device that stores map information, an advertisement information storing device that stores advertisement information for displaying an advertisement, a map information readout setting device that reads out of the map information storing means the map information of an area required by occupant of the vehicle, an advertisement information association device that associates the map information with the advertisement information visually provided to the occupant by being superimposed on an actual landscape being viewed by the occupant, and a distributor that distributes the map information and the advertisement information to the vehicle.

In another preferred embodiment of the present invention, the advertisement information includes positional information on the landscape on which the advertisement is superimposed.

In another preferred embodiment of the present invention, the advertisement information includes timing information on when the advertisement is displayed.

In another preferred embodiment of the present invention, the advertisement information is related to an area displayed in the distributed map information.

In another preferred embodiment of the present invention, the distributor distributes the advertisement information to the vehicles that are registered as consenting to receive the advertisement information.

In another preferred embodiment of the present invention, the landscape on which the advertisement is superimposed is set by an advertiser.

In another preferred embodiment of the present invention, a timing at which the advertisement is displayed is set by an advertiser.

In another preferred embodiment of the present invention, the landscape on which an advertisement is superimposed is set at the vehicle end.

In another preferred embodiment of the present invention, a timing at which the advertisement is displayed is set at the vehicle end.

The above object is also achieved according to the present invention by providing an information distribution server that distributes map information to predetermined vehicles, the server comprising map information storing means for storing map information, advertisement information storing means for storing advertisement information for displaying an advertisement, map information readout setting means for reading out of the map information storing means the map information of an area requited by a vehicle occupant, advertisement information association means for associating the map information with the advertisement information visually provided to the occupants by being superimposed on an actual landscape being viewed by the occupant, and distributing means for distributing the map information and the advertisement information to the vehicle.

BRIEF DESCRIPTION OF THE DRAWINGS

In the accompanying drawings:

FIG. 5 shows the initial settings screen I of the virtual in real system;

FIG. 6 shows the initial settings screen II of the virtual in real system;

FIG. 11 shows the initial settings screen In of the virtual in real system;

FIG. 13 shows the initial settings screen IV of the virtual in real system;

FIG. 14 shows the initial settings screen V of the virtual in real system; and

DETAILED DESCRIPTION OF THE PREFERRED EMBODIMENTS

Preferred embodiments of the present invention will now be described with reference to the drawings. The on-vehicle information provision apparatus according to the invention is able to show the occupants of the vehicle of the apparent position of an object, such as a restaurant, a store, a hotel or other such facility, or a mountain or the like, in a landscape being viewed by the occupants from the windows of the vehicle. It does this by displaying image information relating to the object as a virtual image superimposed on the landscape being actually viewed. The system can also display set messages, advertisements and the like as virtual images superimposed on a landscape actually being viewed by the occupants. The system displays the advertisements on the location that is more close to the occupant than the actual landscape.

Figure 1:
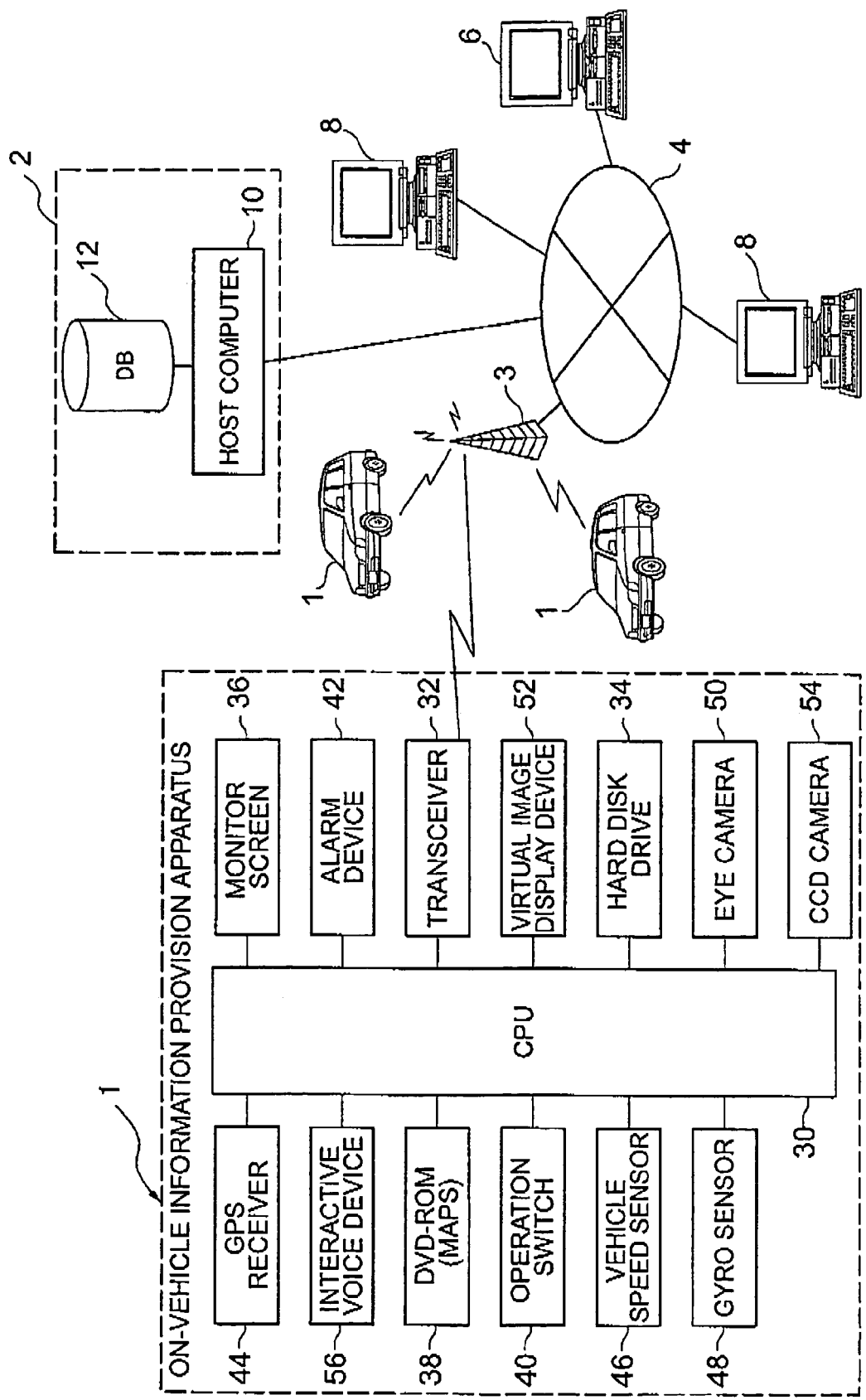
FIG. 1 is a general view of an on-vehicle information provision system (a virtual in real system) that includes an on-vehicle information provision apparatus according to an embodiment of the present invention.

FIG. 1 is a general view of an on-vehicle information provision system (a virtual in real system) that includes an on-vehicle information provision apparatus 1 according to an embodiment of the present invention. The on-vehicle information provision apparatus 1 includes a route navigation system able to navigate the vehicle to a set destination.

An information center (server) 2 is provided for the on-vehicle information provision apparatus 1. Each area has a communication station 3, via which the on-vehicle information provision apparatus 1 can connect with the Internet 4 and receive, from the information center 2, various types of information, including map information and virtual image information.

The system is configured to share information among the on-vehicle information provision apparatuses 1 of a plurality of vehicles running in a convoy group. In the case of FIG. 1, the plurality of on-vehicle information provision apparatuses I are connected via the Internet 4. Also connected to the Internet 4 are terminal devices (PC) 6 at the homes of the vehicles' occupants, and the terminal devices (PC) 8 of companies and shops and the like that wish to distribute their advertisements and other such information.

Figure 2:
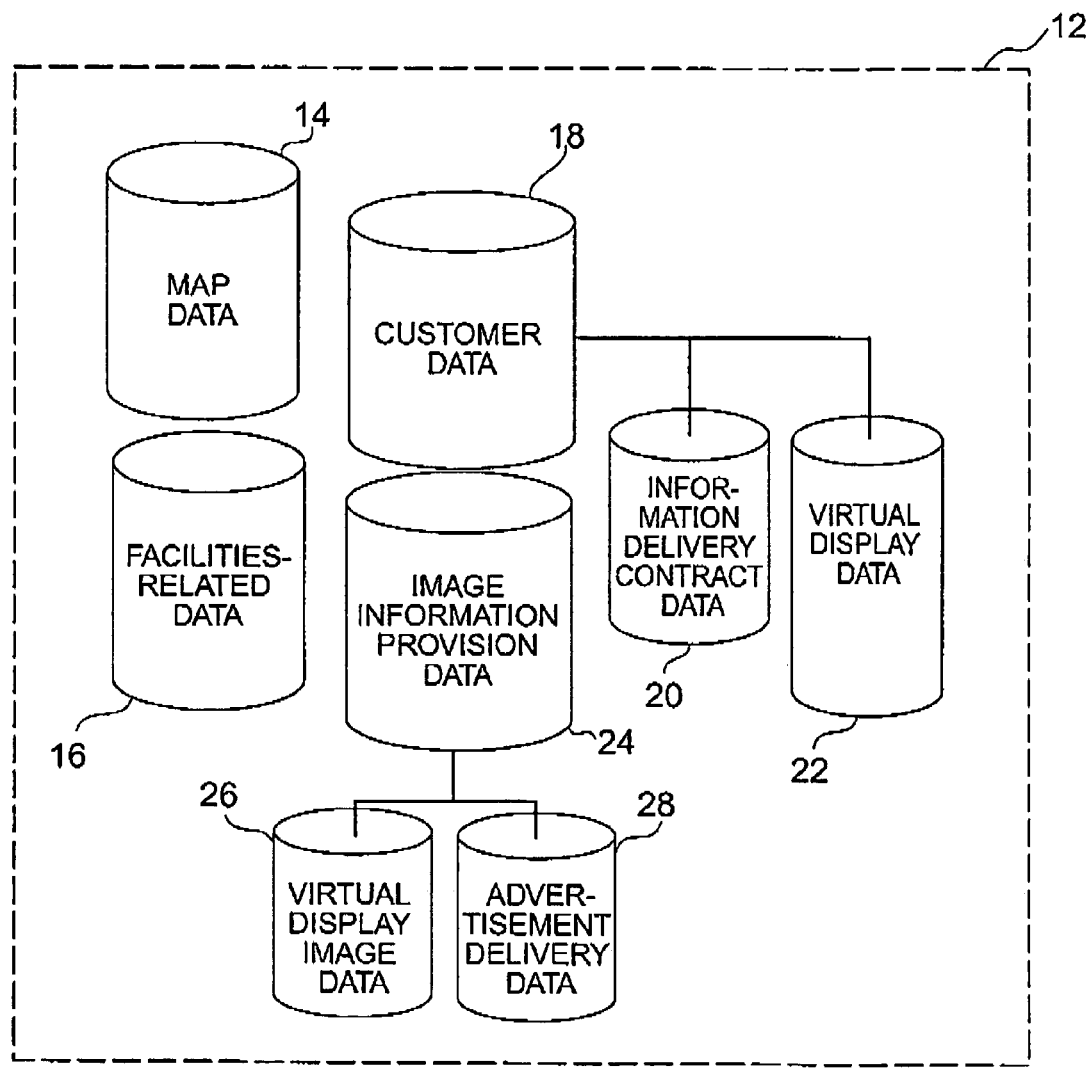
FIG. 2 shows an example of the data included in the information center database.

The information center 2 has a host computer 10 and a database 12. As shown in FIG. 2, data included in the database 12 includes map data 14, facilities-related data 16 and customer data 18. In addition to road related information, the map data 14 three-dimensional data on the size of buildings and the like. Based on this three-dimensional data, it can be estimated what the surrounding buildings and landscape look like from each point on a road. The facilities-related data 16 contains the location, name and features of objects included in the positional information provided by the system.

The customer data 18 includes data relating to the occupants of the vehicle that receives the provided information, and route and destination data set by the occupants. The customer data 18 also includes contract data 20 on information delivery contracts concluded with the occupants, and virtual display data 22 relating to the virtual image mode and the like set by the occupants.

The database 12 also includes data 24 for providing the virtual image information superimposed on the landscape. This image information provision data 24 includes virtual display image data 26 for superimposing virtual images of objects on the landscape and virtual images for navigating a lead car, and advertisement delivery data 28 relating to advertisements the occupants agree to receive.

The on-vehicle information provision apparatus 1 includes a CPU 30 that navigates a vehicle to its destination based on input data and the operations of a driver, and indicates to the occupants of the vehicle the apparent position of a preset object.

The on-vehicle information provision apparatus 1 includes a transceiver 32 that, via the Internet 4, receives various information including map information, buildings information and virtual image information from the information center 2, and sends various information from the vehicle to the information center 2. This transceiver 32 can be comprised by a car telephone, a cellular telephone or a specialized wireless transceiver. In the case of a plurality of vehicles running in a convoy group, the transceiver 32 also functions as a means of communicating information and speech among the vehicles.

The on-vehicle information provision apparatus 1 also includes a hard disk drive (HDD) 34 for storing map information and virtual image information received from the information center 2, a monitor screen 36 for displaying map and other information, a DVD-ROM 38 containing on-board map information and information on buildings, an operation switch 40 for setting a destination and requesting map information and the like from the information center 2, and an alarm device 42 that warns when the system is unable to receive information from the information center 2.

The on-vehicle information provision apparatus 1 is further provided with a GPS receiver 44 for detecting the present location of a vehicle, a vehicle speed sensor 46 and a gyro sensor 48. The GPS receiver 44 receives a radio wave from a satellite to detect the present location of a vehicle, the vehicle speed sensor 46 detects the vehicle speed in order to obtain the distance traveled by the vehicle, and the gyro sensor 48 detects the direction of vehicle travel. The present location of the vehicle can be accurately calculated based on the detection values of the sensors 46 and 48.

The on-vehicle information provision apparatus 1 detects the eye position and line of sight of the driver and other occupants and, based on that information, can superimpose specific virtual image information on the actual landscape being viewed by the occupants. To display these virtual images, the on-vehicle information provision apparatus 1 is equipped with an eye camera 50, a virtual image display device 52 and a CCD camera 54.

The eye camera 50 is attached to the room mirror in the upper part of the cabin, and can detect the position of an occupant's pupils, the direction of the line of sight and the distance to what is being viewed, by photographing the pupils. Techniques that can be applied for the eye camera to accomplish this include the electro-oculographic BOG) method, the photo-electric element EOG (P-EOG) method, the corneal reflex method, the first and fourth Purkinje image detection method, the contact lens method, the searchcoil method and the infrared fundus camera method. It is desirable for the eye camera 50 to be able to detect the sight-line of each of the occupants in the vehicle. Other means may be used instead of the eye camera 50 to detect the sight-lines of vehicle occupants.

Based on the position of the occupants' pupils detected by the eye camera 50 and the current position and direction of the vehicle, the CPU 30 searches the map data and determines whether or not a specific object can be seen by the occupants. If it determines that the object can be seen, virtual image information relating to the object is superimposed on the actual landscape being viewed by the occupants to create a virtual display. The virtual image display device 52 uses a method such as holography to create a virtual display by creating virtual image information relating to the object, such as an arrow pointing to the object, the name of the object, and so forth, that can only be seen by the occupants, and superimposing this virtual image information on the actual landscape that the occupants are looking at.

The CCD camera 54 is attached in a forward-facing position in the upper part of the vehicle. The images obtained by the camera are used to detect the presence of other vehicles running ahead of the vehicle with the camera, the volume of traffic (whether there is traffic congestion, and the degree of such congestion), the presence of pedestrians, how bright it is outside the vehicle, the weather, and so forth. The results of the detection by the CCD camera 54 are sent to the CPU 30, and based on these results, the CPU 30 modifies or prohibits, for example, the virtual image display.

The on-vehicle information provision apparatus 1 is also equipped with an interactive voice device 56. The interactive voice device 56, which is equipped with a loudspeaker and microphone, can provide the occupants with spoken information and receive spoken instructions from the occupants.

Figure 3:
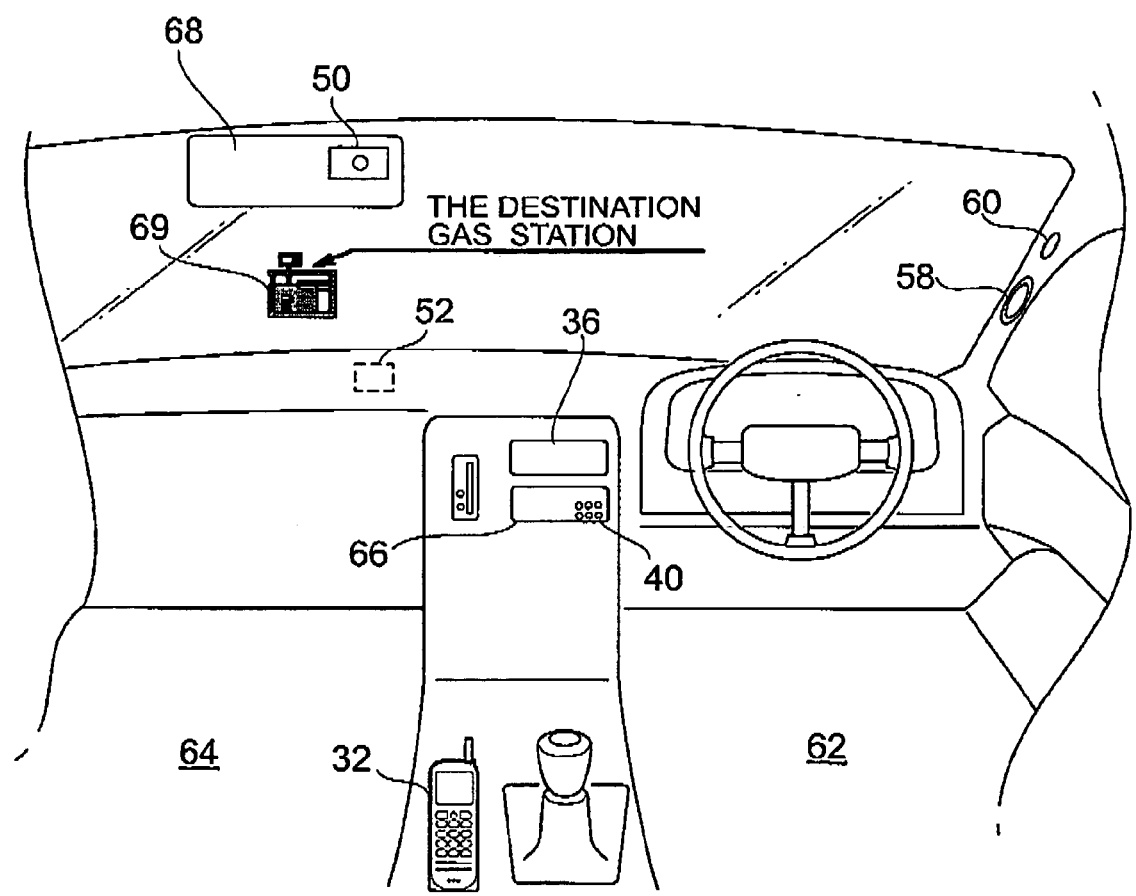
FIG. 3 shows the area around the driver's seat of a vehicle equipped with an on-vehicle information provision apparatus according to an embodiment of the present invention.

FIG. 3 shows the area around the driver's seat of a vehicle equipped with an on-vehicle information provision apparatus 1 according to the embodiment of the invention. Attached to the A-pillar near the driver's seat is a loudspeaker 58 via which the occupants are provided with voice guidance, messages and other such information. Located next to the loudspeaker 58 is a microphone 60 via which spoken instructions from the driver or other occupants can be sent to the CPU 30. Occupant sensors built into the driver's seat 62, front passenger's seat 64 and other seats that are not shown, make it possible to detect whether or not each seat is occupied.

The main unit 66 of the on-vehicle information provision apparatus 1 containing the CPU 30 and the like is attached to the dashboard. The monitor screen 36 is located near to the main unit 66. The eye camera 50 incorporated in the cabin room mirror 68 can detect the pupil position and line of sight of each occupant. The transceiver 32 used to send information to, and receive information from, the information center 2 via the Internet 4 is provided between the driver's seat and front passenger's seat.

This embodiment incorporates a dashboard virtual image display device 52 that utilizes holograms. FIG. 3 shows a virtual image (illustration or photo) 69 of a gas station stand constituting the set object, an arrow pointing to the image and information relating to the object ("The destination gas station") displayed by the virtual image display device 52 as a hologram at the apparent position of the object in the actual landscape being viewed by the occupants, thereby ensuring that it can be seen by the occupants. More specifically, the virtual image display device 52 displays the image information between the set object and the occupants along the straight line extending from the occupant to the set object in the actual landscape.

Figure 4:
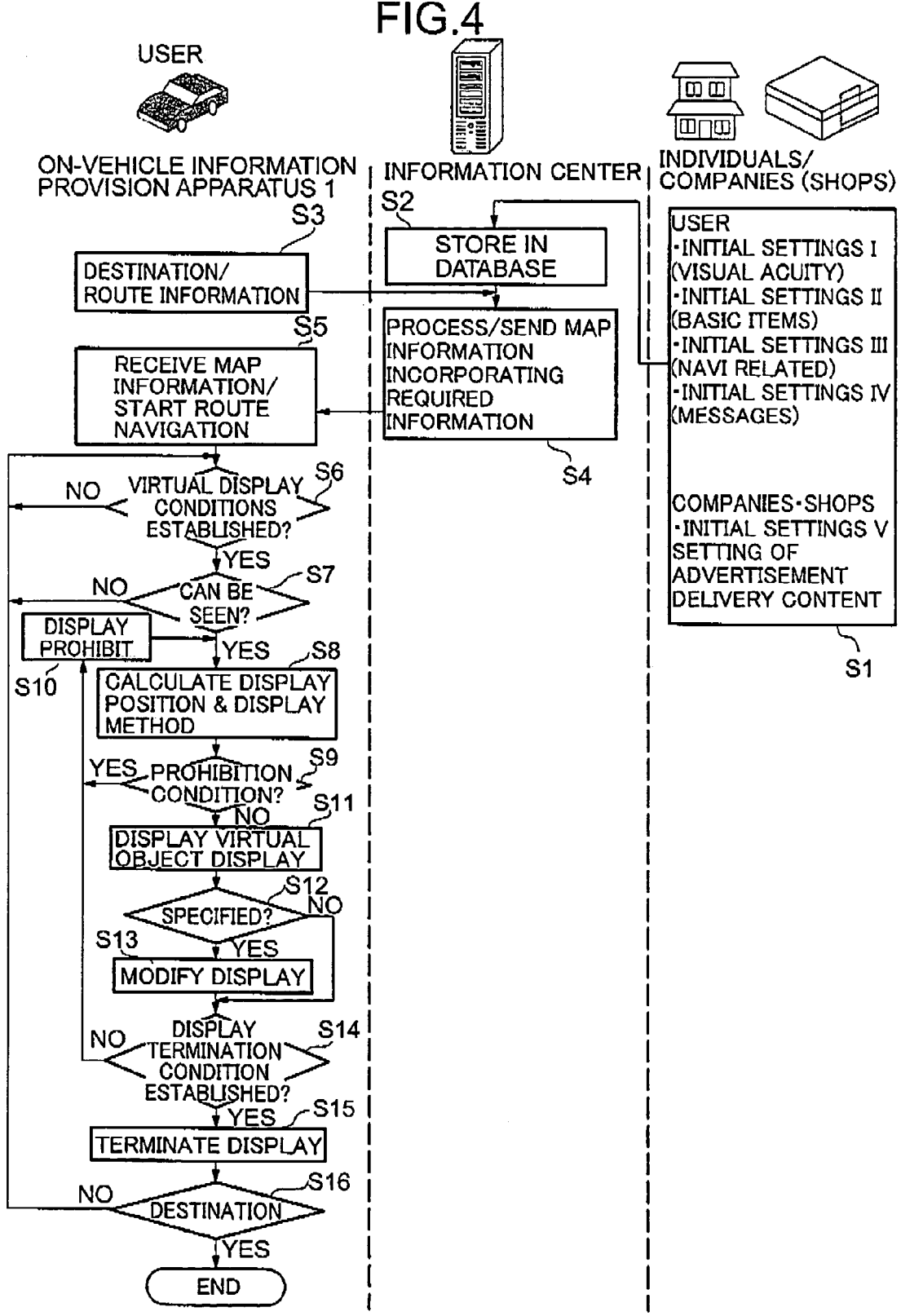
FIG. 4 is a flowchart of the overall system process operated by the on-vehicle information provision apparatus according to the embodiment of the present invention.

The operation of an on-vehicle information provision system that includes the on-vehicle information provision apparatus 1 will now be explained. FIG. 4 is a flowchart of the overall system process operated by the on-vehicle information provision apparatus 1.

A user, such as the driver, for example, who wishes to receive virtual image based information first uses his or her home PC 6 or the like to access the information center 2 to initialize the virtual in real system information provision mode (step S1). This virtual in real system is a type of telematics system that uses wireless communication to provide information to an on-vehicle terminal. It is a fee-based system, with the user paying according to the amount, for example, of the information received. The user's requisite personal information, such as name and address, is registered beforehand.

FIG. 5 shows the initial settings screen I displayed on the user's PC 6, relating to verification of visual acuity and registration. When "Verification of visual acuity and dynamic visual acuity level" is selected, a screen is displayed for testing the user's visual acuity and dynamic visual acuity. After the test is completed, the results are recorded in the customer data 18 in the information center.

Next, when "Eye position registration" is selected, the user's eye position when he or she is seated in the vehicle is registered, based on image data obtained from the eye camera 50. The system may also be configured to estimate the driver's eye position based on the seat position and the angle of the room mirror.

Next, the initial settings screen II shown in FIG. 6 is displayed on the user's PC 6. The initial settings screen II is used to set whether or not to display virtual images, the display method used, and so forth. Details of these settings will now be described.

First, ON or OFF is selected for "Virtual object display" to set whether or not a virtual image is to be displayed. If OFF is selected, a virtual image is not displayed. If ON is selected, the user goes on to select ON or OFF for each of the items "NAVI display," "Message display," and "Advertisement display" to set what kind of virtual images are accepted.

Figure 7:
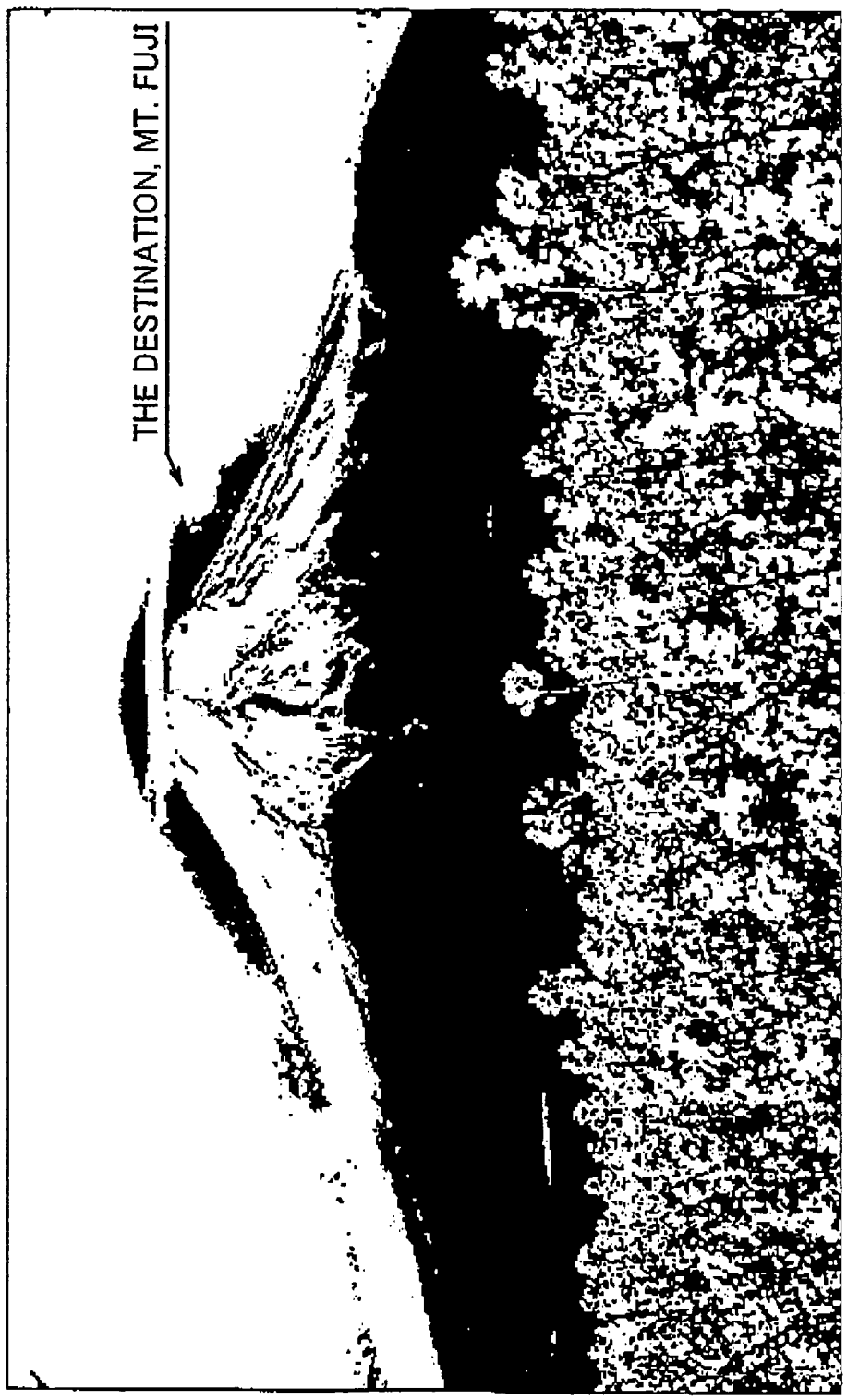
FIG. 7 is an example of a NAVI display showing a landscape on which a virtual image has been superimposed by the on-vehicle information provision apparatus.

If ON is selected for "NAVI display," when the vehicle is running, "NAVI display" will be implemented under the set conditions to superimpose on the actual landscape seen through the vehicle windows, a virtual image such as an arrow pointing to a specified object and an image of the object. In this embodiment, the default setting is to display an arrow pointing to the object, and the name of the object. Thus, if for example Mt. Fuji has been set as the destination object, when Mt. Fuji can be seen through the windshield, an arrow pointing to Mt. Fuji and the words, "The destination, Mt. Fuji," will be displayed superimposed on the landscape being viewed by the occupants, as shown in FIG. 7.

Figure 8:
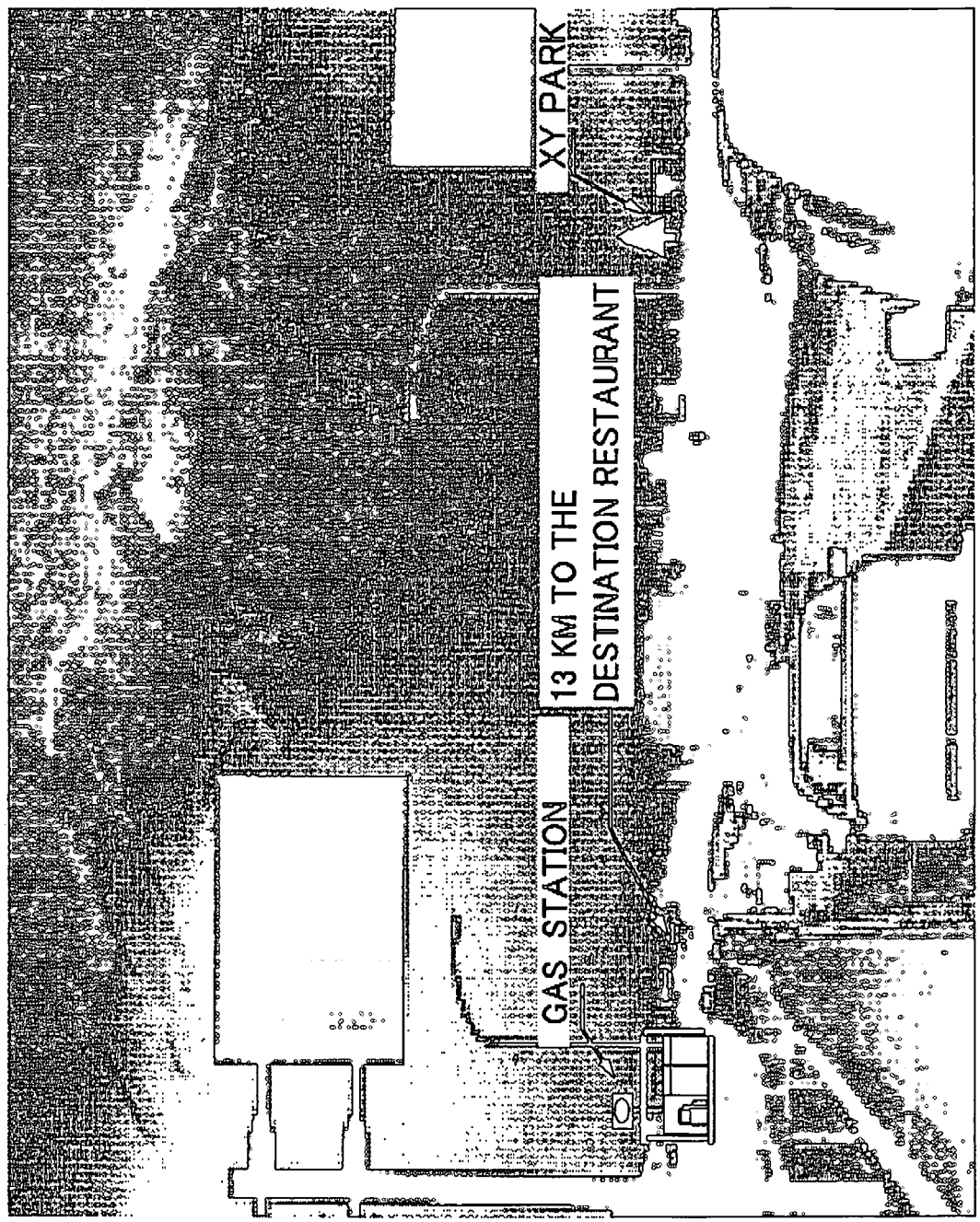
FIG. 8 is another example of a NAVI display showing a landscape on which a virtual image has been superimposed by the on-vehicle information provision apparatus.

By making the required settings, when the set "Gas Station," "Restaurant" and "Park" become visible through the windshield, an illustration or photo of each object will be displayed as an overlay that shows the apparent position of the object within the actual landscape, as shown in FIG. 8. In addition, an arrow pointing to each object and the information relating to each object, that is "Gas Station," "13 km to the destination restaurant," "XY Park," will be displayed as a virtual image superimposed on the actual landscape. The settings controlling whether or not an object image is displayed and other display mode items are set as follows.

Figure 9:
FIG. 9 is an example of a message displayed as a virtual image superimposed on a landscape by the on-vehicle information provision apparatus.

If "Message display" is set ON, a message set by an occupants or friend, under prescribed conditions when the vehicle is running, the message will be displayed as a virtual image overlaid on the actual landscape being viewed. For example, as shown in FIG. 9, when the vehicle has traveled to a prescribed location, the messages "All the best" and "Good Bye" set by a friend are displayed as virtual images superimposed on the actual landscape.

Figure 10:
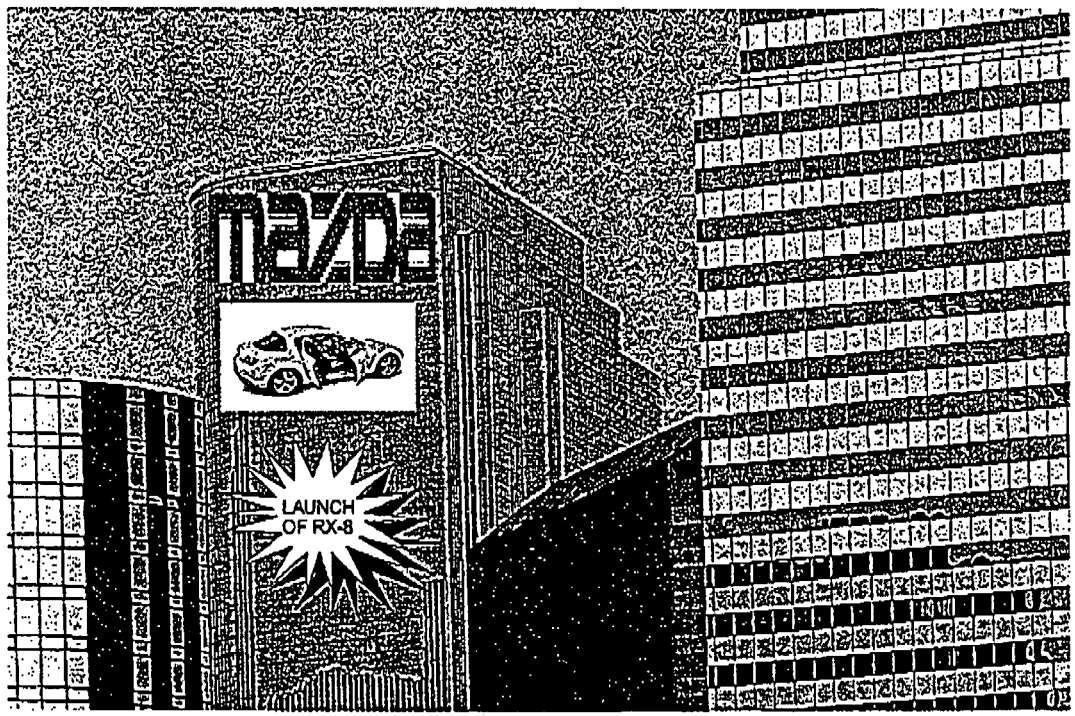
FIG. 10 is an example of an advertisement displayed as a virtual image superimposed on a landscape by the on-vehicle information provision apparatus.

Also, if "Advertisement display" is set ON, while the vehicle is running the system will accept advertisements from companies and shops which have contracted to provide advertisements, and under the set conditions the advertising information will be superimposed as virtual images on the actual landscape being viewed. In the example shown in FIG. 10, the advertising messages "MAZDA" and "Launch of the RX-8" set by the contracting company will be shown as a virtual display superimposed on the actual landscape when the vehicle is traveling through a specific place.

In this embodiment, the company providing an advertisement pays the virtual in real system operator a prescribed advertising fee. By agreeing to accept the advertisement, the user has his or her virtual in real system utilization fee decremented by an amount that corresponds to the advertising amount and the like.

The system can be configured on the user side to set the vehicle position and time at which an advertisement can be received, as well as the advertisement background and the like.

In the example shown in FIG. 6, "NAVI display," "Message display" and "Advertisement display" have all been switched ON, and can be selected for each area. For example, in a local area in which the surroundings are bright, "NAVI display" would normally be unnecessary, and would only be switched ON in specific areas. Or, it could be switched ON for the surrounding area the first time a user drives to a destination. The same goes for "Message display" and "Advertisement display."

The area is set as a display condition and, when it is determined that the vehicle is located in the area, the advertisement is displayed. The time slot is also set as a display condition and, when it is determined that the current time is in the time slot, the advertisement is displayed.

Next, "Virtual display priority" is used to select which of two virtual object displays should have priority when they cannot be displayed at the same time. When the virtual display is set together with the voice guidance, there could be a time overlap between the voice guidance "The destination, Mt. Fuji" in "NAVI Display," and the voice guidance "Launch of RX-8" in "Advertisement display," in which case this setting allows the overlap to be dealt with. In the illustrated example, the order of priority is 1. Message, 2. NAVI, 3. Advertisement. Therefore, when there is an overlap between Message and NAVI, "Message display" is given precedence, followed by "NAVI display."

Next come the "Virtual display settings." The first item here is "Magnification," which is used to set the size of the virtual image (the virtual image of the gas station in FIG. 8, for example) and the size of the characters. The options are "Normal," "×2," "×3" and "Auto." "Normal" means the apparent size of the object as viewed from the vehicle is not magnified, and also refers to the default character size, while "×2" or "×3" means the size of the object image is doubled or tripled. "Auto" means that if the distance to the object is greater than a specified value, it is magnified (by two, for example), while if the distance is not larger than the specified value, normal magnification is used. In the example of FIG. 6, "Normal" is selected.

Next, the number of virtual images that can be simultaneously displayed is set in "Number of simultaneous displays." This setting is used to prevent too many virtual images being displayed. The options are "Default," "Minimum," "Few," "Many" and "Maximum." In the example of FIG. 6, the setting is "Default." This item can be set on an area by area basis.

The next item is "Superimposed display," which controls how the overlapping of virtual images is handled. In this embodiment, the options are "Prohibit" and "Permit." If "Prohibit" is selected, the user is given the option of choosing "Tile" or "Prohibit." Choosing "Permit" allows a plurality of virtual images to be displayed overlapped. If "Tile" is selected, the images are displayed without overlapping. If "Prohibit" is selected, when displaying of virtual images would result in overlapping, all overlapping images, or all but one, are prohibited.

Finally in this part, the "Object display area" item is used to set the virtual display region. In this embodiment, the options are "Standard," "Small," "Large," and "Maximum." With "Large," the whole area of the windshield can be used, with "Standard," just the right half of the windshield (the portion in front of the driver's seat); and with "Small," just a part of the right half of the windshield can be used. Selecting "Maximum" enables the side windows as well as the windshield to be used. In the case of FIG. 6, "Standard" has been selected.

Next, the "Virtual object display time" item is used to set the period of time a virtual object is continuously displayed The options are "Continuous time" and "Total time." "Continuous time" is the continuous time of one display, with the options being "Continue to show while visible," and "15 seconds," which means terminate the display after 15 seconds. In the case of FIG. 6, "15 seconds" has been selected.

"Total time" prescribes the total display time when the time the object is displayed is broken up into a plurality of times, such as when a curve in the road shuts off the view of Mt. Fuji. In the example of FIG. 6, "3 minutes" is selected. Therefore, in the example shown in FIG. 7, when the vehicle is running, the virtual images of the arrow and the words, "The destination, Mt. Fuji," will be displayed for no longer than a total of 3 minutes.

Finally in this part, "Other settings" is used to set the items "With voice guidance," "With object display," "Correct display for each occupant," and the "Enlarge/Reduce/Delete" functions. If ON is selected for "With voice guidance," in the example of FIG. 7, the virtual display of the words "The destination, Mt. Fuji" is accompanied by the words being spoken by the system.

In the basic configuration, the virtual image of an arrow and the object name are displayed at the apparent location of the object. However, if ON is selected for "With object display," as shown in FIG. 8, the object will be displayed as a virtual image of the gas station based on an illustration or photo, providing a virtual display of the location of the gas station within the actual landscape, and showing an arrow pointing to the virtual object and the object name.

When a plurality of occupants are riding in the vehicle, each occupant has a different view of the external landscape, due to the different position of each occupant in the vehicle. As a result, the virtual image of the gas station shown in FIG. 8 will not be seen by all occupants as being superimposed at the actual location of the gas station. "Correct display for each occupant" is used to compensate for this discrepancy. When this option is turned ON, the virtual image display location is adjusted according to the position of each of the occupants, based on the occupant location detection results provided by the seat sensors. This ensures that each occupant sees the vital image displayed at the proper position. It is preferable for the corrected virtual images to be displayed using a method whereby only the occupants concerned can see a corrected image.

Finally in this part is the "Enlarge/Reduce/Delete" item. Selecting ON for this enables the virtual image display mode to be modified based on voice instructions from an occupant. In the case of the virtual image shown in FIG. 8, when ON is selected for "Enlarge/Reduce/Remove," if an occupant tells the system to "Enlarge the display of XY Park," the virtual image of the park is enlarged. Spoken commands can also be used to reduce or delete an image.

When the basic settings shown in the screen image of FIG. 6 have been completed, the system moves to the initial settings screen II screen shown in FIG. 11, to allow the user to make NAVI related settings via the screen of the user's PC 6. Details of the settings are described below.

First, the various "virtual object display items" are set. In this embodiment, the items are "Destination," "Facility," "Lead Car," "Guide Arrow" and "Landmark."

When ON is selected for "Destination," the destination set in the navigation system becomes the object of the virtual display. Thus, if "Mt. Fuji" is set as the destination, the virtual image of Mt. Fuji will be displayed when Mt. Fuji becomes visible, as shown in FIG. 7.

When "Facility" ON is selected, gas stations, convenience stores, restaurants, hotels, hot spring resorts, public buildings and other such facilities are set as the virtual display objects. How a facility is displayed depends on other settings. When "Facility" is ON and "Detailed information" ON is selected, detailed information on each facility is displayed in addition to the virtual arrow image. If, for example, the facility concerned is a hot spring hotel, information related to the quality of the spring will be displayed.

Figure 12:
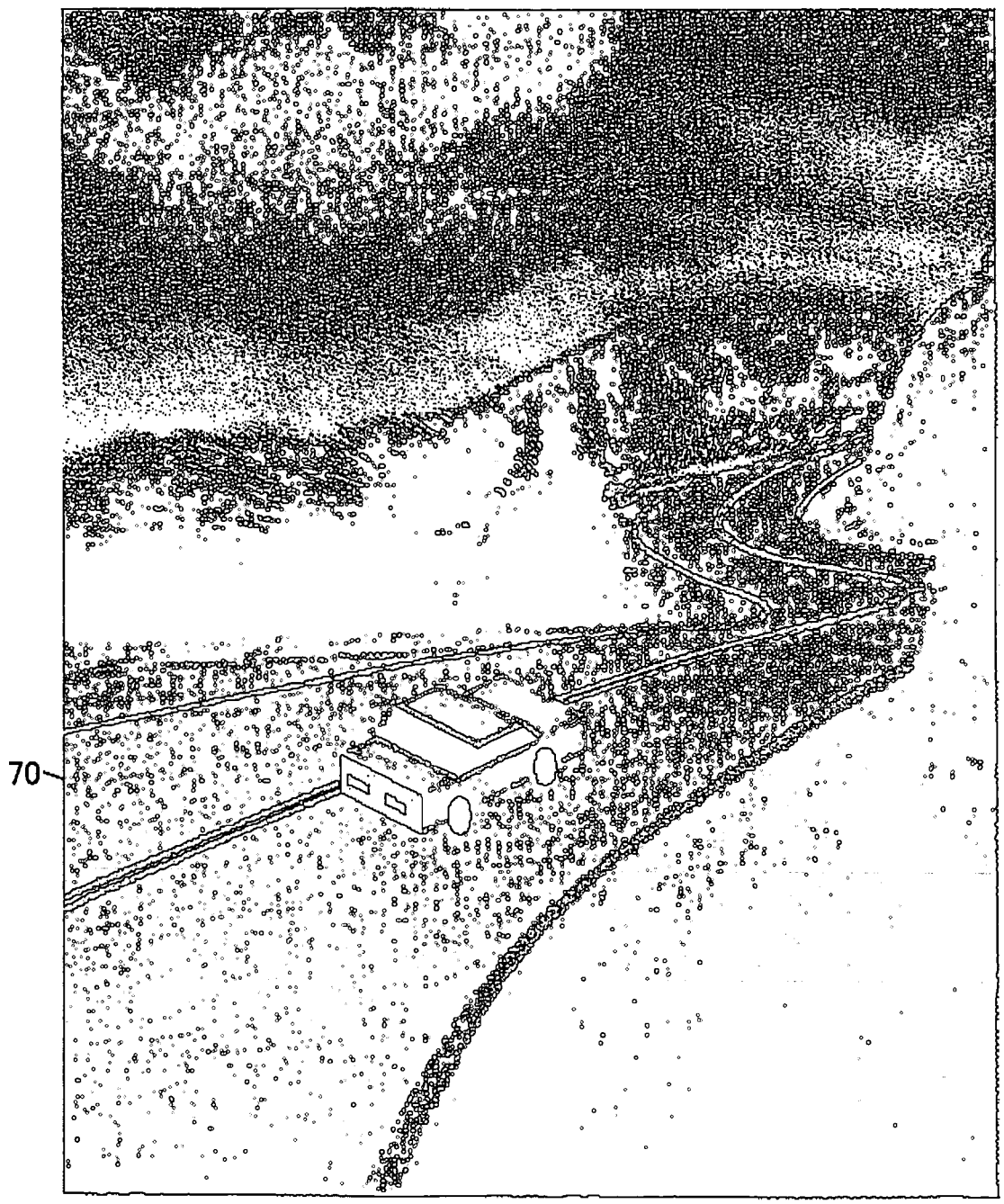
FIG. 12 is an example of a virtual image of a lead car produced by the on-vehicle information provision apparatus.

When ON is selected for "Lead Car," as shown in FIG. 12, the display is of a virtual image of a lead car 70 to be followed to as a guide to the destination. Thus, if the route includes a right turn at the next intersection, the lead car 70 will turn right, so the destination can be reached by following the lead car 70. An animal or other object may be used instead of the lead car 70.

When "Guide Arrow" ON is selected, virtual images of arrows are used to guide the vehicle. Using virtual images of the arrows superimposed on the actual landscape provides navigational guidance in the same way as arrows displayed on the monitor screen of a conventional navigation device.

When "Landmark" ON is selected, buildings and the like constituting landmarks along the route are indicated by a virtual arrow image.

The next items are the "Displayed facility settings," in which are used to set the virtual images used to provide information relating to each category of facility. As shown in FIG. 11, in this embodiment facility categories that can be selected to receive information on locations include "Registered facilities," "Convenience store," "Stations," "Gas stations," "Leisure & Entertainment," "Restaurants," "Event information" and "Famous places."

"Registered facilities" enables a user to manually set facilities as the objects to be informed of This item can be used, for example, to register restaurants along the route to the destination. A particular convenience store or gas station chain can be selected, such as Seven-Eleven convenience stores or ENEOS gas station. In the case of restaurants, the type of food provided can be specified, such as French or Japanese cuisine, sushi, udon noodles, and so forth. Detailed settings can also be made in the case of "Event information" and "Famous places."

Next, the "Object display area" item is used to specify the range of the "NAVI display." As shown in FIG. 11, the options are "Standard," "Small," "Large," and "Maximum." "Standard" sets as the "NAVI display" objects facilities that are in an area measuring one kilometer ahead and 500 meters to the side. Thus limiting the object display area prevents the field of vision being obstructed by the display of the large numbers of virtual images in urban areas.

Next, the "Virtual object display time" item is used to set the period of time a virtual object is continuously displayed. The options are "Continuous time" and "Total time." "Continuous time" is the continuous time of one display, with the options being "Continue to show while visible," and "15 seconds," which means terminate the display after 15 seconds. In the case of FIG. 6, the setting is "15 seconds."

"Total time" prescribes the total display time when the time the object is displayed is broken up into a plurality of times, such as when a curve in the road makes it impossible to see a gas station stand. In the example of FIG. 6, "3 minutes" is selected. In the example shown in FIG. 11, the setting is "3 minutes."

Next, the "Destination setting function" item is used to set destination related functions while the vehicle is running. If, for example, the driver specifies an object to be displayed as a virtual image and sets that object as a destination, this function navigates the vehicle to the destination. In this embodiment, an occupant can specify the destination vocally or by pointing. When "Voice" ON is selected, the destination can be input by voice. In the case of the virtual images displayed in FIG. 8, when the driver or other occupant says, "Destination is XY Park," the interactive voice device 56 recognizes what has been said and sets XY Park as the destination. If "Point" ON is selected, a destination can be input by pointing. In the case of the virtual images displayed in FIG. 8, if the driver or other occupant points at "XY Park" and says "Destination," the operation is input via the eye camera 50, setting XY Park as the destination.

Finally in this part is registration relating to a group of vehicles running as a convoy. When a plurality of vehicles are running in convoy, this setting is used to establish a communication mode whereby the same information is shared among the plurality of vehicles. One member of the group, usually the leader, carries out the registration.

The ID number (or example, 0001, 0002, 00341, 0055) of the on-vehicle information provision apparatuses 1 of the vehicles of the group are input to designate the members of the convoy. Next, the convoy leader is designated. Then, "Facilities displayed to group members" is set to effect shared display among registered group vehicles. The method used for this is the same as that used for "Displayed facility settings." Information relating to facilities set here is provided uniformly to all registered members of the group.

There is also a "Notification function." When the same information is obtained by all the members of the group running in convoy, the notification function is used to notify each vehicle of that fact. For example, if there are five vehicles running as a group, and Mt. Fuji becomes visible from all five vehicles, the color of the words, "The destination, Mt. Fuji," shown in FIG. 7 can be changed from white to blue to indicate that Mt. Fuji can be seen from all of the vehicles.

Other options include "Notify when information can be shared" and "Do not inform." When the "Notify when information can be shared" option is selected, options for how this is done are "Color," whereby the display color changes, or "Voice," whereby the system vocally announces that "Mt. Fuji can be seen from all vehicles."

With reference to FIG. 11, there are also different settings for each of the following options: "By Area," "By Time slot," "By Day" and "By Occupant."

Next, FIG. 13 shows initial settings screen IV used with respect to the setting of items related to the display of messages. A user can send a message to the on-vehicle information provision apparatus 1 of his or her own vehicle directed to himself or herself or to the other occupants, or to the on-vehicle information provision apparatus 1 of the vehicle of a friend or the like, directed at the friend or at all occupants in the friend's vehicle. In this embodiment, there is a "Location-specific message" option for having a message displayed when the vehicle reaches a specific location, and a "Non-location-specific message" option for having the message displayed regardless of the vehicle location, or when other conditions apply.

"Location-specific message registration" is used to register the location at which a message is displayed. The vehicle location is designated by executing the display of a virtual image, using a map displayed on the screen. In the example shown in FIG. 13, when a point is designated on a displayed map of Hiroshima Prefecture, the area around the designated point is displayed enlarged. When a point is then designated on the enlarged view, the surrounding area is again shown enlarged. By repeating this process, it is finally possible to designate "Where national highway No. 2 passes near Saijo, Hiroshima City, Hiroshima Prefecture."

Next, "Period" is used to set when the message is displayed. "Display image and Image adjustment" is used to set the content of the message displayed Clicking on "Designate/Revise display content" causes a virtual image of the designated location, "Where national highway No. 2 passes near Saijo, Hiroshima City, Hiroshima Prefecture," to be displayed on an image retrieved from map data, at which point the message content ("All the best" and "Good Bye") and content (typeface, color, display position, and so forth) can be selected and positioned, after which it can be confirmed and set by clicking on "Confirm displayed content."

Finally, the message recipients are designated. When the message is to be sent to the members of a set group, the recipients are designated by designating the ID numbers of the recipients' on-vehicle information provision apparatus 1. The message may include the name of the recipients.

In the example of FIG. 13, the designated period is from Jun. 6, 2003 to Jun. 6, 2003, and the time slot is all day. Thus, on Jun. 6, 2003, a message sent to ID numbers 001, 002, 004, 065, 075 is displayed when the vehicles concerned pass "Where national highway No. 2 passes near Saijo, Hiroshima City, Hiroshima Prefecture."

"Non-location-specific message registration" is used to set the background of the message display. Options include "Any background," "Use car ahead as background," "Sky," "Road," "Building" and "Signboard/Sign." Optional conditions listed under "Display timing" include "Time," "When the sea comes into view," and "Every 3 hours." In the example shown in FIG. 13, the display timing is set to be from 15:00 to 15:05.

While shown partly abridged, as in the case of "Location-specific message registration," optional settings include "Period," "Display image and image adjustment" and "Message recipients."

FIG. 14 shows initial settings screen V used with respect to setting content related to advertisements. The basic method used is the same as that for the setting of items related to the display of messages described above. The difference between the display of advertisements and the display of messages is that the advertisement sender is set. Senders are companies and shops that have concluded a contract with the system supervisor (at the information center 2), and recipients are system users who have agreed to receive the advertisements.

Companies and shops and the like use their PC 8 to register with the information center the content of advertisements, the timing of an advertisement display, areas, background and other such details. An advertiser may, for example, set its own head office building as the background for its advertisements. As mentioned above, the advertising company and store pays a prescribed advertising fee.

As in the case of message displays, there are location-specific advertisements and non-location-specific advertisements, which are set using basically the same methods used to set the display of messages. However, there are also options for setting advertisement recipients. The options are "Contracted to receive advertisements" and "Designate advertisement recipient." When "Contracted to receive advertisements" is selected, advertisements are shown uniformly to all users who have agreed to accept advertisements. When "Designate advertisement recipient" is selected, among users who have agreed to receive advertisements, advertisements are shown only to those users who satisfy specific criteria, such as males in their thirties.

The various items registered as described above are stored in the data 18, 20 and 22 of the database 12 of the information center 2 (step S2).

Next, the user who has made the above settings transmits destination and the requisite route information from the on-vehicle information provision apparatus 1 (or from his or her home PC 6) to the information center 2 (step S3). The information center 2 retrieves from map data 14 map information to the set destination and compiles delivery map data relating to the route to the destination. Based on the settings of step S1, virtual image based NAVI display data and data for displaying messages and advertisements are processed for incorporation into the map data, and the processed data is transmitted to the user's on-vehicle information provision apparatus 1 (step S4). It is preferable to incorporate in the map data advertisements related to the area shown on the maps displayed along the route to the destination. The on-vehicle information provision apparatus 1 of the user's vehicle receives the transmitted data thus processed and, based on the data, starts navigating to the destination (step S5).

Next, the on-vehicle information provision apparatus 1 determines whether or not conditions for displaying a virtual image have been met (step S6). With respect to the NAVI display, it is determined whether or not there are objects in the vicinity relating to which information should be provided in the form of virtual images. With respect to the display of messages and advertisements, it is also determined whether or not the display conditions set via the initial setting screens IV and V have been met.

This determination is carried out based on the position of the vehicle as detected by the GPS receiver 44 and the like, and based on information relating to objects to be displayed contained in the processed map data and to the locations thereof. If the determination in step S6 is YES, the process moves to step S7 and determines whether or not the occupants of the vehicle can see the object and the area constituting the background to messages and the like. As well as the ability to directly see or distinguish the object with the naked eye in an actual landscape, "can see" includes being able to see the location where the object exists although the object may appear to be small and not distinguishable to the naked eye due to the fact it is away from the vehicle.

This determination is based on the position and direction of the vehicle, three-dimensional data on buildings and the topography around the current location of the vehicle included in the map information, object position information, and whether or not the CCD camera 54 detects a vehicle ahead. If the determination in step S6 or S7 is NO, the process returns to step S6.

If the determination in step S7 is YES, the position at which a virtual image should be displayed and the display method are calculated (step S8). For the display of a virtual image, a position is set that will allow it to be seen as being at a prescribed position in the landscape being viewed by the occupants. That is, in the example of FIG. 7, the virtual image of the arrow and the information, "The destination, Mt. Fuji," will be set at a position at which the occupants will be able to see that the arrow is pointing to Mt. Fuji in the actual landscape. This also applies to the setting of the display position in the examples of FIGS. 8, 9 and 10.

Specifically, the eye position of an occupant, such as the driver, for example, is estimated from eye camera images, and based on the eye position, the current location and direction of the vehicle, map data and so forth, the system calculates the positioning for placing the virtual images at the prescribed locations in the actual landscape being viewed by driver. If there are a plurality of occupants in the vehicle, it is preferable to detect the eye position of each occupant and set the position of the virtual image display for each of the occupants.

More specfically, the location information of the set object is read out from the map database 12 and then it is determined whether or not the there is an obstacle or obstacles (which is recognized from three-dimensional map data in the map database 12) on the line extending from the present location of the vehicle to the location of the set object. If the object can be seen, the direction from the present location of the vehicle to the location of the set object is calculated and at the same time the moving direction of the vehicle is also calculated. Then, based on the direction from the present location of the vehicle to the location of the set object and the moving direction of the vehicle, the direction toward the set object against the moving direction of the vehicle is determined. Then the eye position of the occupant is detected, and finally the image information is displayed on the straight line extending from the eye position to the location of the set object.

The method of displaying the virtual images may be appropriately set according to the initial settings, such as "Arrow" and name such as in the case of FIG. 7, and a virtual image of the object (gas station stand) and the name of the facility (Gas Station) such as in the case of FIG. 8. The color and brightness of a displayed virtual image, such as an arrow, can be set according to the color and brightness of the actual scenery forming the background. The actual color and brightness of the scenery forming the background can be detected from images from the CCD camera 54 and the like.

The size of a virtual image can be set in accordance with the "Magnification" item described with reference to FIG. 6. It is often impossible to visually distinguish objects at nighttime and when vision is hampered by bad weather. Therefore, for such conditions, a configuration can be used that automatically supplements an object display.

When the accuracy of the vehicle's current location is poor, when the object is distant, when the apparent size of an object (the size as seen by the naked eye) is small and at other such times, a configuration may be used that automatically supplements the object display. At times when the accuracy of the vehicle's current location is poor and the like and it is highly possible that the tip of the virtual arrow image does not point properly at the object, object display can be used to show the approximate location of the object and point the arrow to that object, to achieve a display condition that seems less odd.

Next, the process advances to step S9, in which it is determined whether or not the virtual image display prohibition conditions apply. Prohibition conditions are conditions under which displaying a virtual image could interfere with the safe driving of the vehicle. Specific examples include when the vehicle is turning, namely, except when the vehicle is stationary or moving straight ahead. The examples further includes when there is heavy traffic in the vicinity, and when the virtual image display would overlap visual traffic information means, including traffic signs. Also, when objects relating to which image information is to be provided by using a virtual image are very close so that the number of virtual images would exceed the prescribed number, would also qualify as a display prohibition condition.

When the determination in step S9 is YES, in step S10 display prohibition processing is carried out and the process returns to step S6. If the determination is NO in step S9, the process advances to step S11 and the virtual image is displayed. When the determination in step S9 is NO, instead of the display prohibition processing of step S10, the images can be tiled to prevent virtual images overlapping traffic signs, or the number of virtual images can be decreased, after which the process can move to step S11.

In step S11, virtual images are displayed as shown in FIGS. 7 to 11, based on the settings made in step S1. For when a virtual image is a display of a message from a friend or the like, a function can be included whereby, via the information center 2, the sender's friend is informed of the message display.

Next, the process moves to step S12, where it is determined whether or not one of the virtual images being displayed has been specified by an occupant. An occupant who looks at a virtual image can specify it by saying "XY Park" or the like, or he or she can specify it by pointing to it and saying "This park." The words are picked up by the microphone 60, and the pointing action is imaged by the CCD camera 54 and sent to the CPU 30, thereby detecting the specified object.

The process then moves to step S13, at which processing is carried out to modify the specified virtual image display mode. Specific items that are modified include color, size, occupant designation, for example, to enable a virtual image that could only be seen by the driver to be seen by other occupants. In modifying the display mode, it is preferable to correct for the differences in the positions of the occupants. In addition, details of the object can be added to the virtual display. If the object is a park, for example, the virtual image could also display the history of the park.

The system can be configured so that before making changes to the display mode, it is confirmed whether or not the object concerned was specified by the occupant making the changes. With respect to virtual images displayed to the specifying occupant, it is preferable to use voice confirmation of changes in image color and the like. If the object concerned is XX Park, for example, voice confirmation such as "XX Park?" should be used.

Next, the process advances to step S14 where it is determined whether or not display termination conditions have been met. Termination conditions include when the virtual object image cannot be seen by the vehicle occupants, the number of times an image is displayed exceeds the prescribed number, the total display time exceeds the specified value, the object has gone outside the display area, or the operating panel has been used to manually switch the display off. Determination of these termination conditions is carried out for each virtual image. If the determination in step S14 is YES, the process moves on to step S15 and the virtual image display is terminated.

The process moves on to step S16, where it is determined whether or not the destination has been reached. When it is determined that the destination has been reached, the process is terminated. If the destination has not been reached, the process returns to step S6.

Figure 15:
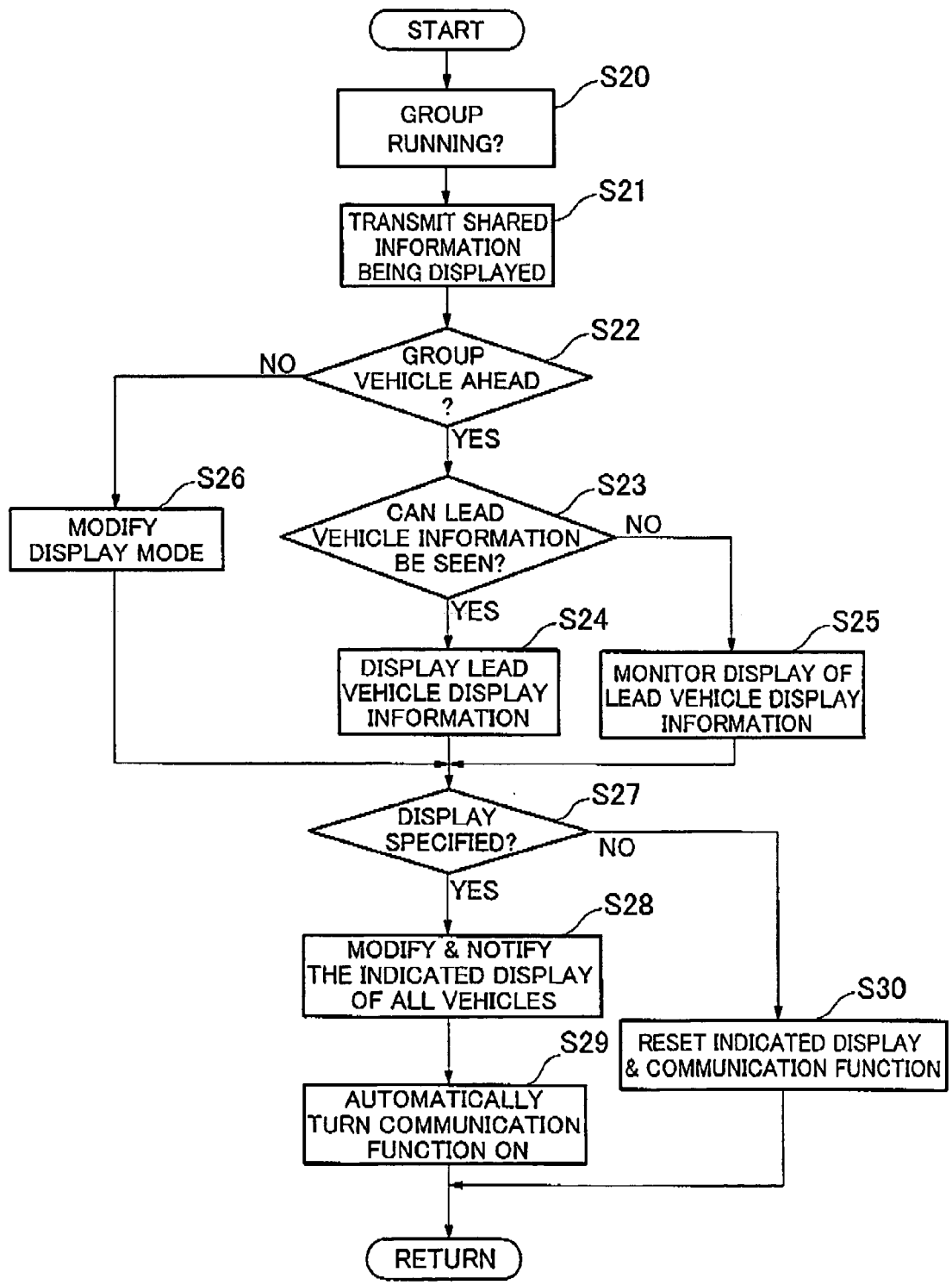
FIG. 15 is a flowchart of the processing related to the convoy group function of the on-vehicle information provision apparatus.

The group running function utilized when a plurality of vehicles run in a convoy will now be explained With the group running function, the on-vehicle information provision apparatuses of a plurality of pre-registered vehicles running as a group are used to share information related to objects and facilitate communication among the occupants of the plurality of vehicles. The group running function will now be described with reference to FIG. 15, which is a flowchart of the processing relating to the group running function carried out by the on-vehicle information provision apparatus 1.

In step S20, it is determined whether or not group running is being implemented. This determination is based on whether or not the ID of the on-vehicle information provision apparatus 1 of this vehicle has been registered as a member of the group in the group running function section of the initial settings screen II of FIG. 11. If it is a registered member, the map information transmitted in step S4 of the flowchart of FIG. 4 includes information indicating that the vehicle is a registered member.

If in step S20 the determination is YES, the process advances to step S21, in which the information center 2 is notified that shared information is being displayed. That is, the information center 2 is notified of which of the facilities registered as "Facilities displayed to group members" in the initial settings screen II are being displayed as virtual images.

The process then moves to step S22, where it is determined whether or not there are other vehicles of the group in front of this vehicle. If the answer is YES, meaning this vehicle is not the lead vehicle, the process moves to step S23 and it is determined whether or not information being displayed by the lead vehicle of the group can be seen by this vehicle.

If in step S23 the answer is YES, the process advances to step S24 and a virtual image of the lead vehicle is displayed. If in step S23 the answer is NO, the process advances to step S25 and information related to the object being displayed in the lead vehicle is displayed on the monitor screen 36. As a result, information related to the same object is displayed by all the vehicles of the group.

If in step S22 the answer is NO, meaning this vehicle is at the head of the group, the process moves to step S26 and the virtual object being displayed in the vehicle is displayed by all the other vehicles of the group and the display mode (color, for example) of the virtual image being displayed on the vehicle changes when steps S24 and S25 are concluded by the other vehicles. This makes it possible for the other vehicles of the group to know that they have received the same object information as this vehicle.

The same modification of the display mode as that of step S26 can be carried out when the object being displayed in the lead car as a virtual image becomes visible to the other vehicles of the group.

Next, in step S27, it is determined whether or not any of the objects being displayed as virtual images or the like has been specified. If, for example, a member of the group says "XY Park" or points to the object park being displayed, the object is detected by the CCD camera 54 or the like and the information is sent to each on-vehicle information provision apparatus 1, via the information center 2, whereby the answer in step S27 becomes YES. With a YES at step S27, the process moves to step S28, at which, in the on-vehicle information provision apparatus 1 of each vehicle, the color or other display mode of the designated display object, for example, "XY Park," is changed. This enables the occupants of each vehicle to realize the position of "XY Park" and that the park is the topic of conversation.

Next, in step S29, a communication function is activated to enable voice communication (by car phone or cellular phone, for example) between vehicles, making it possible for members of the group to talk among themselves about XY Park. If in step S27 the answer is NO, the process advances to step S30, in which the indicated display and communication function are reset.

Although the present invention has been described with reference to a specific, preferred embodiment, those skilled in the art will recognize that modifications and improvements can be made to the extent that such modifications and improvements remain within the scope of the invention.

For example, in the foregoing embodiment, data relating to virtual images is delivered to the on-vehicle information provision apparatus 1 from the information center 2, together with map data. However, the data can be delivered to the on-vehicle information provision apparatus 1 separately from the map data.

In the above embodiment, also, while virtual images of the same objects are provided to the occupants of the same vehicle, an arrangement could instead be used whereby each occupant is provided with different virtual images. For this, the object to be displayed to each occupant as a virtual image would be set beforehand, and information input on which occupant is sitting in which seat.

Also, while in the above embodiment the basic virtual images that are set in the NAVI display are an arrow pointing to the object and the name of the object, an arrangement may be used that includes a display pattern showing only an arrow.

The above embodiment has also been described with reference to the on-vehicle information provision apparatus of the invention applied to an ordinary passenger car. However, the present invention can also be applied to sightseeing buses and the like. For this, a configuration can be used that, when a guide announces that a temple can be seen from the window, displays a virtual image of the temple to each customer and changes the color of virtual images that have already been displayed.

In the case of the above embodiment, moreover, virtual images of objects are displayed at the apparent position of the object. However, a configuration can be used whereby the objects shown by the virtual images are displayed adjacent to the apparent position of the object, with an arrow pointing to the object. A system configuration can also be used whereby the virtual object image display can be enlarged or reduced by voice command or the like.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claim is:

1. An on-vehicle information provision apparatus for visually providing a vehicle occupant with an advertisement, said apparatus comprising:
a display condition setting device that sets predetermined display conditions for displaying the advertisement;
a condition determination device that determines whether or not said display condition applies;
an advertisement display device that, when said display condition does apply, visually provides the occupant, based on an eye position and a line of sight of an occupant with the advertisement shown superimposed on an actual landscape so that the occupant can see the advertisement at a prescribed position in the actual landscape being viewed through a windshield of the vehicle by the occupant; and
a display prohibition device that prohibits the advertisement from being displayed over an actual traffic sign or other actual visual traffic information.

2. An on-vehicle information provision apparatus according to claim 1, wherein said apparatus further comprises a map information receiver that receives map information from an information center, said map information receiver receiving advertise information for displaying said advertisement together with the map information.

3. An on-vehicle information provision apparatus according to claim 1, wherein said display condition setting device sets an area as the display condition, and said condition determination device determines whether or not a vehicle location is in said area.

4. An on-vehicle information provision apparatus according to claim 1, wherein said display condition setting device sets a time slot as the display condition, and said condition determination device determines whether or not current time is in said time slot.

5. An on-vehicle information provision apparatus according to claim 1, wherein said apparatus further comprises an advertisement information receiver that receives advertise information for displaying said advertisement from an information center.

6. An on-vehicle information provision apparatus according to claim 1, wherein said apparatus further comprises a second display prohibition device that prohibits the advertisement from being displayed except when the vehicle is stopped or moving in a straight line.

* * * * *